Aug. 30, 1960  E. W. SWANSON  2,951,166
DEVICES FOR REDUCING SHAFT CURRENTS IN
ROTATING ELECTRIC MACHINES
Filed April 29, 1958  3 Sheets-Sheet 1

INVENTOR
EDWIN W SWANSON

Akel C. Benson
ATTORNEY

INVENTOR
EDWIN W. SWANSON
Akel C. Benson
ATTORNEY

Aug. 30, 1960 E. W. SWANSON 2,951,166
DEVICES FOR REDUCING SHAFT CURRENTS IN
ROTATING ELECTRIC MACHINES
Filed April 29, 1958 3 Sheets-Sheet 3
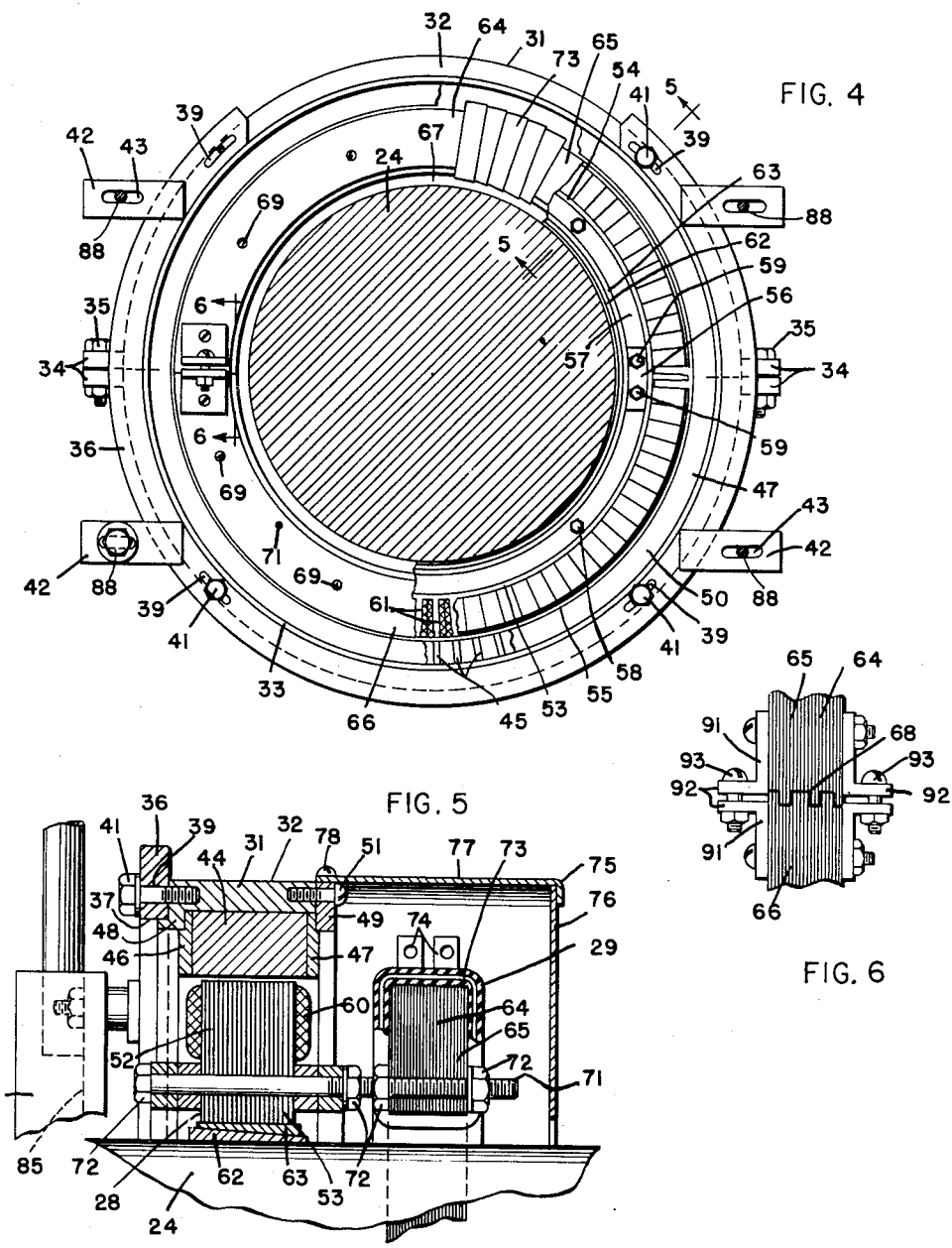
INVENTOR
EDWIN W. SWANSON
*Akel C. Benson*
ATTORNEY United States Patent Office 2,951,166
Patented Aug. 30, 1960

2,951,166

DEVICES FOR REDUCING SHAFT CURRENTS IN ROTATING ELECTRIC MACHINES

Edwin W. Swanson, Minneapolis, Minn., assignor to Electric Machinery Mfg. Company, Minneapolis, Minn., a corporation of Minnesota Filed Apr. 29, 1958, Ser. No. 731,802

6 Claims. (Cl. 310—68)

This application for patent is a continuation in part of my copending application for patent for Devices for Reducing Shaft Currents in Rotating Electrical Machines, Serial Number 655,740, filed April 29, 1957, now abandoned.

The herein disclosed invention relates to devices for reducing shaft currents in rotating electric machines and has for an object to provide a device which will greatly reduce said current and prevent injury to the shaft journals and bearings of the machine.

Another object of the invention resides in providing a device by means of which an electromotive force of substantially the same frequency and magnitude as the frequency and magnitude of the electromotive force of the shaft current and substantially one hundred and eighty electrical degrees out of phase therewith is caused to oppose the current flow through the circuit of the shaft current so as to reduce and even eliminate the shaft current.

A still further object of the invention resides in providing a device having an alternating-current generator whose frequency varies with the frequency of the electric machine and which energizes a transformer inductively coupled to the shaft current circuit.

An object of the invention resides in physically separating the stator core and rotor core of the generator from the stator core and rotor core of the electric machine so as to provide separate flux paths therefor.

An object of the invention resides in driving the generator from the rotor of the electric machine.

Another object of the invention resides in arranging the core of the transformer so as to encircle the shaft of the electric machine to inductively couple the primary of transformer to the shaft current circuit of which the shaft forms the secondary of the transformer.

A still further object of the invention resides in attaching the rotor of the generator to said shaft and with the stator attached to the frame of the electric machine, said stator encircling said shaft and rotor and in attaching the core of said transformer to said shaft to rotate in unison with the rotor of said generator.

A still further object of the invention resides in attaching the core of the transformer to the core of the rotor of the generator.

Other objects of the invention reside in the novel combination and arrangement of parts and in the details of construction hereinafter illustrated and/or described.

In the drawings:

Fig. 4 is a transverse elevational-sectional view taken on line 4—4 of Fig. 2 and drawn to a greater scale.

Fig. 5 is a fragmentary longitudinal-sectional view taken on line 5—5 of Fig. 4 and drawn to a still greater scale.

Fig. 6 is a fragmentary sectional detail view taken on line 6—6 of Fig. 4.

Figure 1:
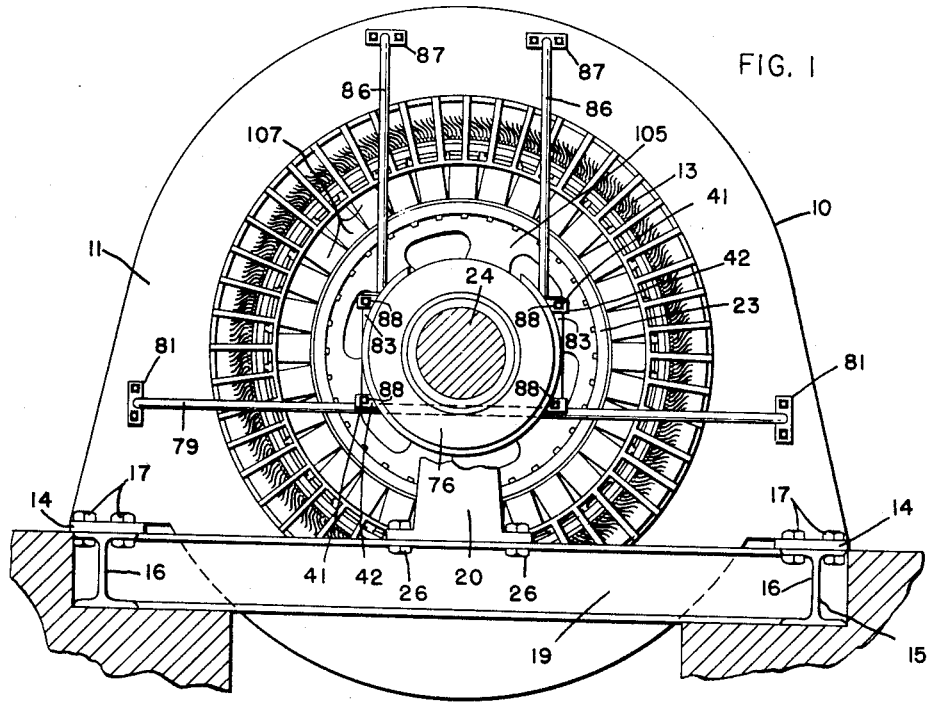
Fig. 1 is an elevational view of a rotating electric machine illustrating an embodiment of the invention applied thereto.
Figure 2:
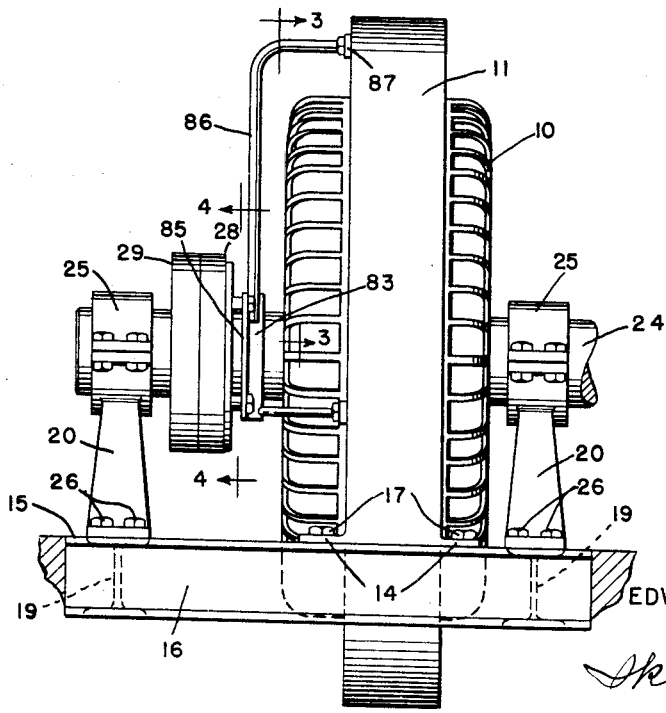
Fig. 2 is a side elevational view of the structure shown in Fig. 1.

For the purpose of illustration, an alternating-current machine 10 in the form of a three-phase synchronous 950 H.P. motor has been shown which was designed to operate on a voltage of 2300 volts, 60 cycles per second, at a speed of 225 r.p.m. This motor has a hollow frame 11 which is constructed of steel plate welded together and which is provided with feet 14 which rest on a supporting structure 15. The supporting structure 15 consists of two longitudinal I-beams 16 and bolts 17 extend through the feet 14 and are bolted to said beams. The feet 14 are usually disposed above the lowermost portion of the frame 11 and the I-beams 16 are imbedded in the foundation on which the alternating-current machine is installed. Welded to the I-beams 16 are transverse I-beams 19. The motor 10 includes a core 12 which is built up of laminations formed in segments 101, there being twelve segments to the circle. In the assembly of the laminations, the segments are overlapped so as to break the joints between segments. The segments are keyed together by keys 102 which have welded to them lugs 103 which are bolted to the frame 11. The core 12 is constructed with two hundred sixteen slots 104 in which are disposed windings 13 adapted to be connected to the source of electromotive force for running the motor. The motor 10 further includes a rotor 23 which comprises a spider 105 mounted on a shaft 24 journaled in bearings 25 disposed on each side of the frame 11. These bearings are mounted on pedestals 20 which rest on the I-beams 19 and are bolted thereto in the same manner as the feet 14 and by means of bolts 26. The spider 105 has bolted to it thirty-two poles 106 on which are field windings 107 which are energized in the customary manner. Amortisseur windings 108 are also employed for the purpose of starting the motor.

In the particular form of alternating-current machines shown, a closed electrical circuit results which includes the shaft 24, the bearings 25, pedestals 20, and the supporting structure 15 comprising the I-beams 16 and 19. The core 12 being constructed of laminations in the form of segments, the joints between segments cause unequal magnetic reluctances in the core which results in an alternating shaft current passing through the shaft, bearings, pedestals and supporting structure of said closed electrical circuit. Such currents injure the journals of the shaft 24 and the bearings 25 so that the said bearings have to be frequently replaced where the shaft current becomes excessive and the journals of the shaft 24 must be refinished or machined smaller to eliminate the damaged surface. In a motor constructed as disclosed in this application, the shaft was short circuited by a cable, and the current passing through the cable was measured and found to vary between 78 and 110 amperes. This shaft current had a frequency of 180 cycles per second. The instant invention overcomes these disadvantages by providing a generator driven in synchronism with the alternating-current machine and a transformer energized therefrom and having a primary winding inductively related to said electrical circuit to produce in said circuit an electromotive force of substantially the same frequency and magnitude as the frequency and magnitude of the electromotive force producing said shaft current and substantially one hundred and eighty electrical degrees out of phase therewith.

The generator and transformer used with the invention encircle the shaft 24 and are indicated by the reference numerals 28 and 29 and are shown in detail in Figs. 4 and 5.

The generator 28 consists of a frame 31 which is in the form of a ring split diametrically and formed in two halves 32 and 33. These halves have lugs 34 extending outwardly therefrom and which are bolted together by means of bolts 35. Secured to the frame 31 is a mounting ring 36 which is constructed with an opening 37 through which the shaft 24 may pass. This ring has circumferentially extending slots 39 formed in the same and bolts 41 extending through said slots and screwed into the frame 31 hold the ring 36 attached to said frame. The ring 36 has brackets 42 welded to the same and which are similarly provided with slots 43. These brackets are used for mounting the generator and attached parts in proper position with reference to the alternating-current machine 10.

Mounted within the frame 31 and forming part of the stator 44 of said generator are ninety-six permanent magnets 45. These magnets are disposed between two split retaining rings 46 and 47 preferably constructed of brass or some other suitable material having high magnetic reluctance. The retaining ring 46 butts up against a flange 48 extending inwardly from the frame 31. A split clamp ring 49 engages the retaining ring 47 and overlies one end of the frame 31. Screws 51 extending through clamp ring 49 and screwed into the frame 31 attach said clamp ring to the frame and securely clamp the permanent magnets 45 in place. The magnets 45 are arranged so that one pole thereof contacts the ring 31 and the other pole thereof faces inwardly. The magnets are also arranged with the polarity of the adjacent poles thereof alternating.

The generator 28 also includes a rotor 52 which is constructed with a core 53. Core 53 is also constructed in halves which are indicated by the reference numerals 54 and 55. The core 53 is laminated and the magnetic laminations held together by means of split clamp rings 57 which are bolted to said core by means of bolts 58. The two core sections are connected together by means of tie plates 56 which overlie the adjoining ends of the clamp rings 57. Bolts 59 extending through the adjoining parts secure the two halves 54 and 55 together. The core 53 is provided with ninety-six slots 61 and in which are arranged coils 50 connected in series to form a winding 60. The core 53 encircles the shaft 24 and is secured thereto by means of two tapered split collars 62 and 63. These collars, when moved longitudinally relative to one another expand and engage the shaft 24 and said core to securely hold the same attached to the shaft 24.

The transformer 29 comprises a core 64 constructed of laminated magnetic material which is circular and formed with two halves 65 and 66. This core also encircles the shaft 24 which serves as the secondary winding of said transformer but is of sufficient diameter to form a space 67 therebetween. The adjoining portions of the core are formed with tongue and groove connections 68 as shown in Fig. 6 and the laminations thereof are secured together by means of rivets 69. Bolts 71 extend through said core and also through the core 53 of rotor 52. Nuts 72 screwed on said bolts clamp the bolts to the core 53 and also support the core 64 from core 53. The two halves 65 and 66 of this core have attached to them angle-shaped brackets 91 which have outstanding legs 92. Bolts 93 extend through these legs and clamp the parts together.

Encircling the core 64 at one locality thereof is a primary winding 73 which is insulated from said core. This winding has a number of taps 74 connected to certain of the turns thereof and which project outwardly from said winding. The winding 73 extends through the space 67 between the shaft 24 and the core 64. One end of the winding 60 is connected to one end of the primary winding 73 of transformer 29. The other end of the winding 60 is adapted to be connected to any of the taps 74. In this manner, the current produced by the generator 28 feeds the primary winding 74 of transformer 29.

The transformer 29 is enclosed by means of a case 75 having an annular radial portion 76 and a cylindrical portion 77. The cylindrical portion 77 overlies the clamp ring 49 and is secured thereto by means of cap screws 78.

The stator 44 of generator 28 is supported in the following manner: The alternating-current machine has a transverse bar 79 which is formed with mounting plates 81 at its ends and which are secured to the frame 11 of said machine. This bar normally supports the brushes of the alternating-current machine and which have not been shown in the drawings. Welded to this bar on opposite sides of the shaft 24, are two upright angle-shaped supports 82 and 83, which have coplanar flanges 84 and 85. These flanges have welded to them at their upper ends braces 86 which in turn have secured to the ends of them plates 87 attached to the frame 11. The brackets 42 of the generator 28 overlie these flanges and are secured to the supports 82 and 83 by means of bolts 88. As noted, these bolts pass through the slots 43 which are elongated in form and which permit of adjusting the stator 44 with reference to the rotor 52.

Figures 3, 7:
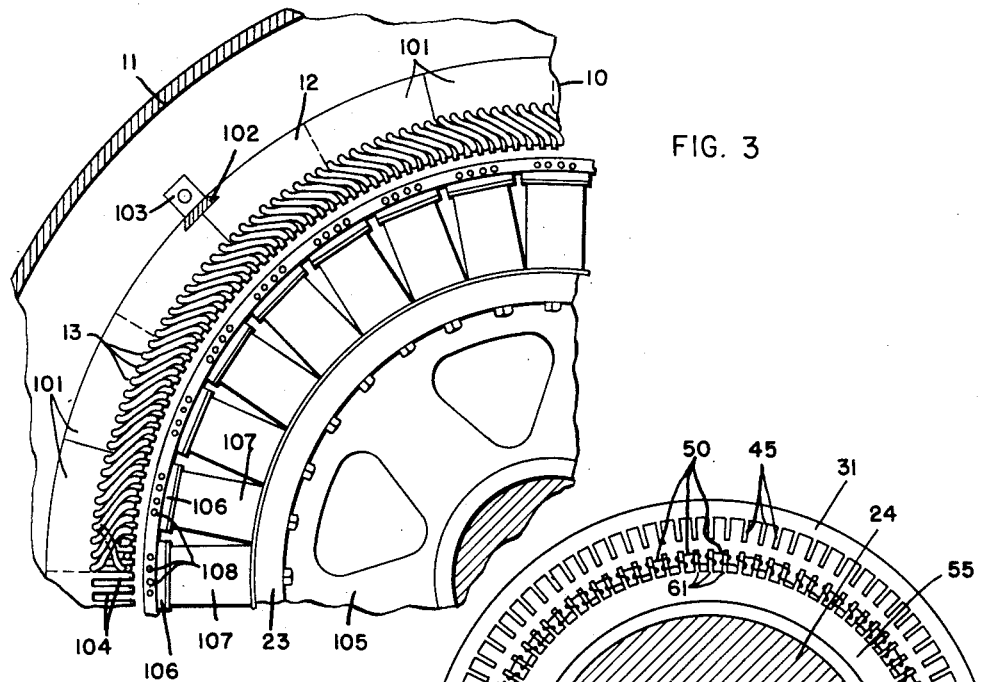
Fig. 3 is a fragmentary transverse elevational-sectional view taken on line 3—3 of Fig. 2 and drawn to a greater scale.
Fig. 7 is a wiring diagram of the invention.

In Fig. 7 a wiring diagram of the invention is shown. The parts have been diagrammatically indicated and the winding 60 of the generator and the winding 73 of the transformer have been shown with a minimum number of turns. However, it can readily be comprehended that both the generator and transformer are designed to give the desired voltages and sufficiently heavy wire is used to carry the necessary current. One end 94 of the winding 60 is connected by means of a conductor 95 to one end 96 of the winding 73. The other end 97 of the winding 60 is connected by means of a conductor 98 to one of the taps 74 of the transformer winding 73. The said taps are provided to give various voltages so that a suitable electromotive force may be procured to offset the electromotive force producing the shaft current in the electrical circuit.

In designing the generator 28 and transformer 29, the frequency and amplitude of the electromotive force producing the shaft current is determined, and the generator 28 designed to produce an electromotive force of the same frequency by selecting the requisite number of permanent magnets 45. The core 53 is then constructed with a corresponding number of poles and coils 50 of winding 60 wound in the slots of said core. Transformer 29 is designed to step down the electromotive force produced by the generator 28 to a proper value to offset the electromotive force producing the shaft current. As will be noted in Fig. 4, the cap screws 41 clamping the ring 36 to the frame 31 pass through slots 39. When these cap screws are loosened, the stator 44 may be adjusted circumferentially to vary the phase relation between the electromotive force produced by transformer 29 and that producing the shaft current. When properly adjusted, the two electromotive forces are substantially equal and one hundred and eighty electrical degrees out of phase and the resulting current through the shaft is reduced to a minimum.

The advantages of the invention are manifest. The shaft current can be greatly reduced with the invention and without changing the construction of the electric machine. Both the generator and transformer are preferably constructed in halves, so that the same may be applied to the electric machine without dissembling or altering the machine. The invention can be used with electric machines having shaft currents of any frequency. The transformer and wound member of the generator may both be stationary and connected together without the use of brushes or collector rings. There hence is nothing to wear out and the device will operate indefinitely once the proper adjustments have been made.

The device functions properly regardless of the speed of the machine.

Changes in the specific form of the invention, as herein described, may be made within the scope of what is claimed without departing from the spirit of the invention.

Having described the invention, what is claimed as new and desired to be protected by Letters Patent is:

1. In a rotating electric machine having a shaft, a stator provided with a stator core constructed of laminated segments encircling said shaft and a rotor having a rotor core mounted on said shaft and encircling the same, bearings in which said shaft is mounted for rotation and supporting means for said bearings, said shaft, bearings and supporting means forming a closed electrical circuit, the joints between laminations in said stator core producing in said core unequal magnetic reluctances resulting in a shaft electromotive force in said electrical circuit, the combination of an alternating-current generator having a stator with a stator core physically separated from the stator core of the electric machine, and a rotor provided with a rotor core physically separated from the rotor core of the electric machine, the cores of said generator providing a magnetic circuit separate from the magnetic circuit of said electric machine, a transformer having a core encircling said shaft, and a winding thereon energized by the electromotive force produced by said generator, the rotor of said generator being driven at a predetermined relative speed with reference to the rotor of said electric machine and the stator core of said generator having a predetermined number of poles, said poles being arranged so that the frequency of the electromotive force induced in said electrical circuit by said transformer is substantially one hundred and eighty degrees out of phase with the shaft electromotive force produced in said electrical circuit by said electric machine, the electromotive force impressed on said electrical circuit by said transformer being substantially equal to the shaft electromotive force.

2. In an alternating-current rotating electric machine having a shaft, a stator provided with a stator core constructed of laminated segments encircling said shaft and a rotor having a rotor core mounted on said shaft and encircling the same, bearings in which said shaft is mounted for rotation and supporting means for said bearings, said shaft, bearings and supporting means forming a closed electrical circuit, the number of joints between laminations in said stator core being greater than two and producing in said stator core unequal reluctances resulting in a shaft electromotive force in said electrical circuit of a frequency greater than that of the electromotive force of said electric machine, the combination of an alternating-current generator having a stator with a stator core physically separated from the stator core of the electric machine, and a rotor provided with a rotor core physically separated from the rotor core of the electric machine, the cores of said generator providing a magnetic circuit separate from the magnetic circuit of said electric machine, a transformer having a core encircling said shaft, and a winding thereon energized by the electromotive force produced by said generator, the rotor of said generator being driven at a predetermined relative speed with reference to the rotor of said electric machine and the stator core of said generator having a predetermined number of poles greater in number than the number of poles of said electric machine and of a number such that the generator frequency will at all speeds of the electric machine be equal to the shaft electromotive force frequency, and said poles being arranged so that the frequency of the electromotive force induced in said electrical circuit by said transformer is substantially one hundred and eighty degrees out of phase with the shaft electromotive force produced in said electrical circuit by said electric machine.

3. In an alternating-current rotating electric machine having a shaft, a stator provided with a stator core constructed of laminated segments encircling said shaft and a rotor having a rotor core mounted on said shaft and encircling the same, bearings in which said shaft is mounted for rotation and supporting means for said bearings, said shaft, bearings and supporting means forming a closed electrical circuit, the joints between laminations in said stator core producing in said stator core unequal reluctances resulting in a shaft electromotive force in said electrical circuit of a frequency differing from that of the electromotive force of said electric machine, the combination of an alternating-current generator having a stator with a stator core physically separated from the stator core of the electric machine, and a rotor provided with a rotor core physically separated from the rotor core of the electric machine, the cores of said generator providing a magnetic circuit separate from the magnetic circuit of said electric machine, a transformer having a core encircling said shaft, and a winding thereon energized by the electromotive force produced by said generator, the rotor of said generator being driven at a predetermined fixed relative speed with reference to the rotor of said electric machine and the stator core of said generator having a predetermined number of poles differing in number from the number of poles of said electric machine and of a number such that the generator frequency will at all speeds of the electric machine be equal to the shaft electromotive force frequency, and said poles being arranged so that the frequency of the electromotive force induced in said electrical circuit by said transformer is substantially one hundred and eighty degrees out of phase with the shaft electromotive force produced in said electrical circuit by said electric machine.

4. In an alternating-current rotating electric machine having a shaft, a frame, a stator carried by said frame and provided with a stator core constructed of laminated segments encircling said shaft and a rotor having a rotor core mounted on said shaft and encircling the same, bearings in which said shaft is mounted for rotation and supporting means for said bearings, said shaft, bearings and supporting means forming a closed electrical circuit, the joints between laminations in said stator core producing in said stator core unequal reluctances resulting in a shaft electromotive force in said electrical circuit of a frequency differing from that of the electromotive force of said electric machine, the combination of an alternating-current generator having a stator with a stator core physically separated from the stator core of the electric machine and encircling said shaft, said stator core being carried by said frame, said alternating-current generator further including a rotor provided with a rotor core encircling said shaft and physically separated from the rotor core of the electric machine, said rotor core being attached to and rotating with said shaft, said rotor core of the generator having windings thereon, the cores of said generator providing a magnetic circuit separate from the magnetic circuit of said electric machine, a transformer having a core encircling said shaft and attached to and supported by said rotor core of said generator, and a primary winding thereon, connections between said generator rotor and transformer windings and rotatable wtih said rotor, the stator core of said generator having a predetermined number of poles differing in number from the number of poles of said electric machine and of a number such that the generator frequency will at all speeds of the electric machine be equal to the shaft electromotive force frequency, and said poles being arranged so that the frequency of the electromotive forces induced in said electrical circuit by said transformer is substantially one hundred and eighty degrees out of phase with the shaft electromotive force produced in said electrical circuit by said electric machine.

5. In an alternating current rotating electric machine having a shaft, a frame, a stator carried by said frame and provided with a stator core constructed of laminated segments encircling said shaft and a rotor having a rotor core mounted on said shaft and encircling the same, bearings in which said shaft is mounted for rotation and supporting means for said bearings, said shaft, bearings and supporting means forming a closed electrical circuit, the joints between laminations in said stator core producing in said stator core unequal reluctances resulting in a shaft electromotive force in said electrical circuit, the combination of an alternating-current generator having a stator with a stator core physically separated from the stator core of the electric machine and encircling said shaft, said stator core being carried by said frame, said alternating-current generator further including a rotor provided with a rotor core encircling said shaft and physically separated from the rotor core of the electric machine, said rotor core being attached to and rotating with said shaft, said rotor core of the generator having windings thereon and fixed relative to and rotating with said shaft, a transformer having a core encircling said shaft and fixed relative to said shaft and a primary winding thereon, connections between said generator rotor and transformer windings and rotatable with said rotor, the stator core of said generator having a predetermined number of poles of a number such that the generator frequency will at all speeds of the electric machine be equal to the shaft electromotive force frequency, and said poles being arranged so that the frequency of the electromotive force induced in said electrical circuit by said transformer is substantially one hundred and eighty degrees out of phase with the shaft electromotive force produced in said electrical circuit by said electric machine.

6. In an alternating current rotating electric machine having a shaft, a frame, a stator carried by said frame and provided with a stator core constructed of laminated segments encircling said shaft and a rotor having a rotor core mounted on said shaft and encircling the same, bearings in which said shaft is mounted for rotation and supporting means for said bearings, said shaft, bearings and supporting means forming a closed electrical circuit, the joints between laminations in said stator core producing in said stator core unequal reluctances resulting in a shaft electromotive force in said electrical circuit, the combination of an alternating-current generator having a stator with a stator core physically separated from the stator core of the electric machine and encircling said shaft, guide means acting between said generator stator and said frame and supporting said generator stator for circular movement about the axis of said shaft, locking means acting between said frame and generator stator and holding said stator in fixed relation relative to said frame, said alternating-current generator further including a rotor provided with a rotor core encircling said shaft and physically separated from the rotor core of the electric machine, said rotor core being attached to and rotating with said shaft, said rotor core of the generator having windings thereon, the cores of said generator providing a magnetic circuit separate from the magnetic circuit of said electric machine, a transformer having a core encircling said shaft and fixed relative thereto, and a primary winding thereon connected to the winding of said rotor of said generator, the stator core of said generator having a predetermined number of poles of a number such that the generator frequency will at all speeds of the electric machine be equal to the shaft electromotive force frequency, and said poles being arranged so that the frequency of the electromotive force induced in said electrical circuit by said transformer is substantially one hundred and eighty degrees out of phase with the shaft electromotive force produced in said electrical circuit of said electric machine.

References Cited in the file of this patent
UNITED STATES PATENTS 1,100,294     Frick _____ June 16, 1914